United States Patent [19]
Bunner et al.
[11] 4,381,328
[45] Apr. 26, 1983

[54] PAVING AND FLOOR BLOCK COMPOSITION AND METHOD OF PRODUCTION

[75] Inventors: Matthew R. Bunner; William H. Heinhuis, both of Elkhart, Ind.

[73] Assignee: Industrial Wood Products, Inc., Elkhart, Ind.

[21] Appl. No.: 301,221

[22] Filed: Sep. 11, 1981

[51] Int. Cl.[3] .......... B32B 3/26; B32B 5/16

[52] U.S. Cl. .......... 428/171; 428/170; 428/218; 428/326; 428/332; 428/485

[58] Field of Search .......... 428/326, 332, 485, 528, 428/218, 171, 170; 156/62.2

[56] References Cited

U.S. PATENT DOCUMENTS 3,988,183 10/1976 Senn .......... 156/62.2
4,241,133 12/1980 Lund et al. .......... 428/326

OTHER PUBLICATIONS

"Kreolite News", vol. 64, No. 1, Spring, 1981.

*Primary Examiner*—Paul J. Thibodeau
*Attorney, Agent, or Firm*—Marmaduke A. Hobbs; Raymond W. Campbell

[57] ABSTRACT

A composition and method for forming paving and floor blocks suitable for use on industrial floors and the like in which the finished blocks are water and abrasion resistant. The composition includes wood particles and formaldehyde resin and may include paraffin base wax for increased mold release characteristics, as well as pigments for block coloration. The method includes mixing the materials of the composition, pouring the composition into a mold, compressing the composition in the mold, and baking the mold with composition therein to cure the mixture and form the block.

13 Claims, 6 Drawing Figures

PAVING AND FLOOR BLOCK COMPOSITION AND METHOD OF PRODUCTION

BACKGROUND OF THE INVENTION

Wood blocks are used as a covering layer on floors and as decorative accents on floors, walls and the like in many buildings, both industrial and residential. The wood floors provide greater resiliency than the concrete slabs on which they are placed, thereby providing a more comfortable surface for workers to walk and stand on. The wood floors are more quiet than concrete or other hard surface floors, and the noise from traffic of humans and machines is less objectionable when wood floors are used. Another advantage in using wood covered floors is that, because of the resiliency of a wood floor, less damage occurs to articles which fall from a work bench or the like. A concrete floor, for example, being less resilient than wood, will normally nick, dent or otherwise damage items which fall thereon.

In the past, wood floors for industrial purposes have been made of blocks cut from beams or the like, and the blocks have been installed with the end grain exposed as the upper surface of the floor. These types of floors provide the comfort, noise control and resiliency desired from a wood floor; however, various disadvantages are inherent in the use thereof. One of the primary disadvantages in using end cut blocks for floors is that the open grain of the wood is exposed as the upper surface of the floor, and, notwithstanding the fact that the blocks are treated with tar or other preservative, moisture is absorbed by the blocks. If a substantial amount of liquid is spilled and absorbed by the blocks, the blocks will swell significantly, causing the floor to buckle. If a large spill occurs on an industrial wood floor comprised of end cut blocks, an entire area of the floor may have to be removed and replaced due to swelling of the blocks and the resultant buckling of the floor. Further, solvents or other corrosive materials spilled on the floor are absorbed by the end cut blocks and, again, the floor can be damaged extensively, requiring removal of the damaged blocks and replacement thereof. A yet further problem associated with the end cut block type floors is that the exposed wood is susceptible to a substantial amount of wear, and, in areas having high volume traffic, or other significantly abrasive action, the wood blocks can wear substantially in a relatively short period of time. Thus, for example, depressions may be formed in the floor near a work station at which a worker stands for extended periods of time and pivots or turns repeatedly on his feet in performing a work function. In aisles or other traffic lanes the floor can become uneven, requiring periodic replacement of sections of the floor to maintain a relatively smooth surface.

SUMMARY OF THE INVENTION

It is therefore one of the principal objects of the present invention to provide a paving and floor block composition which utilizes wood waste products and by-products from other wood processes to form a wood block suitable for use on industrial floors, and which provides a block having sufficient resiliency to provide advantages similar to those of previously used wood floors, yet which is resistant to liquid absorption and wear from repetitive human and/or vehicle traffic.

Another object of the present invention is to provide a block of the aforesaid type, which is uniform in size and shape, rendering installation thereof uncomplicated, and which repels water for substantially minimizing floor damage and buckling due to the presence of water on the floor block.

Still another object of the present invention is to provide a method for producing a paving and floor block from wood waste products such as wood chips and sawdust from different tree species, and which can be used for producing blocks having various water and wear resistant characteristics as well as blocks of different colors and sizes.

These and other objects are achieved in the present invention by providing a paving and floor block comprising wood particles, and a binder of formaldehyde resin. A paraffin base, water emulsified wax can be used to enhance handling and mold release characteristics. The fibers, resin and wax are thoroughly mixed in a bin or impeller type mixer, and the thoroughly blended mixture is compressed in a mold. Holes having rounded inner ends are formed in the block by studs which extend inwardly into the mold cavity from the bottom of the mold, and as the mixture is compressed, regions which are more dense than the surrounding body of the block are formed along the top surface of the block, between the top surface and the rounded inner ends of the holes, and along the sides of the holes from the rounded inner ends to the bottom of the block. The mold with the mixture therein is heated in an oven to cure the resin in the mixture. Water resistance can be varied by varying the resin concentration, and pigment can be added for coloring the blocks. The blocks offer sufficient resiliency for wood floor purposes, yet the blocks are resistant to water, wear and abrasion.

Additional objects and advantages of the present invention will become apparent from the detailed description and the accompanying drawings.

DETAILED DESCRIPTION OF THE PREFERRED EMBODIMENT

Figure 2:
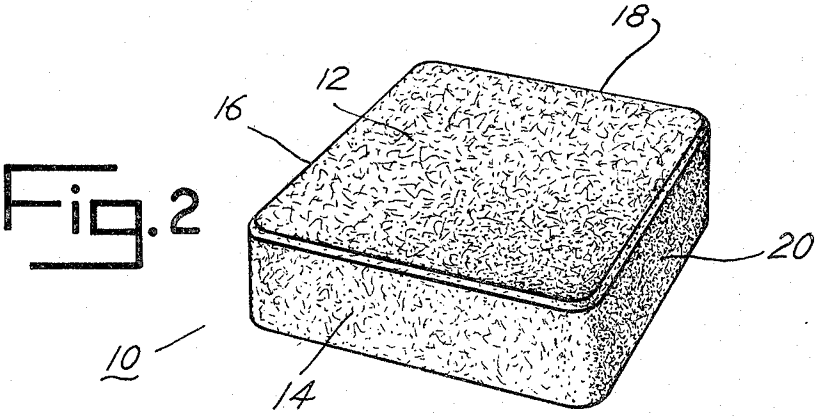
FIG. 2 is a perspective view of the top of a paving and floor block embodying the present invention.

The composition and method for forming paving and floor blocks embodying the present invention will now be described more fully. A block embodying the invention is shown in FIG. 2 and designated by numeral 10. The blocks can be made in different sizes and shapes, depending upon the manner and conditions in which the block will be used; however, a square block measuring about five and one-half ($5\frac{1}{2}$) inches on each side has been found to be a suitable all purpose block which is easily adaptable for most uses. The block can be rectangular or of other shapes if the finished floor is to have a design or pattern in it; however, the square block has been found to be most easily adapted to a variety of different installations. The block can be made in different thicknesses, according to the needs of a particular use for the block; however, a block which is approximately two inches thick has been found to be suitable for most applications, and will cure rapidly during manufacture for an economically produced product.

Figure 6:
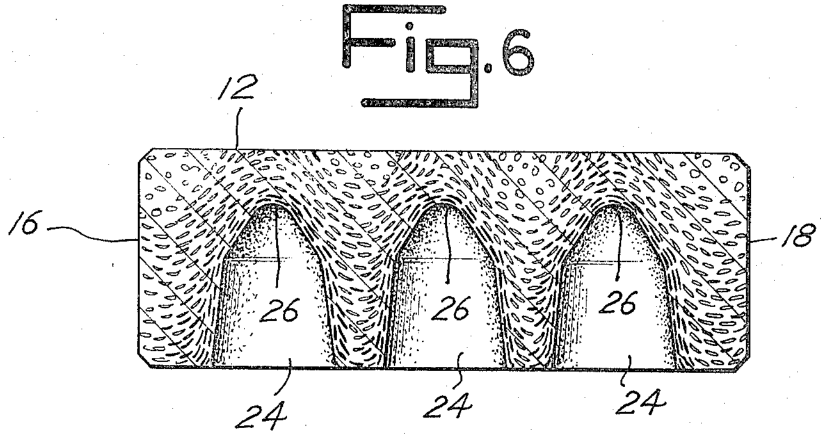
FIG. 6 is a cross sectional view of the block shown in FIG. 5, taken on line 6—6 of the latter figure.

The block includes a relatively smooth, dense top surface 12 and relatively smooth side surfaces 14, 16, 18 and 20. The edges along both the top and bottom of the side surfaces are chamfered about one-eighth (⅛) inch at a forty-five degree (45°) angle. The corners of the block formed by the side surfaces are rounded to prevent chipping or breakage during transporting, handling and installing of the blocks. Block 10 includes a bottom surface 22 having disposed therein a plurality of holes 24 which are equally spaced from each other and arranged in three rows of three holes each. In a five and one-half (5½) inch square block the holes are one and one-eighth (1⅛) inch in diameter and one and seven-sixteenths (1 7/16) inch deep. Blocks of different sizes can have more or fewer holes and holes of different sizes. The holes taper inwardly and have rounded inner ends 26 as shown in FIG. 6. The purpose of the holes is to reduce the material content of the block and to aid in the compression of the wood particles by creating desirable flow patterns. The studs in a mold for forming the holes also decrease the time required for curing the block during the manufacturing process. The need for the holes, and particularly the projections in the mold for forming the holes, will be described more fully hereinafter, as the method of the formation is more fully described.

Figure 3:
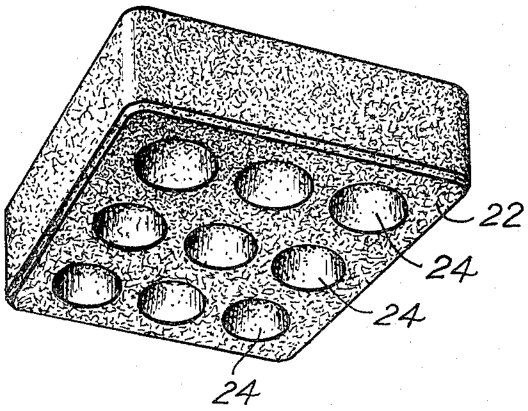
FIG. 3 is a perspective view of the bottom of the block shown in FIG. 2.
Figure 4:
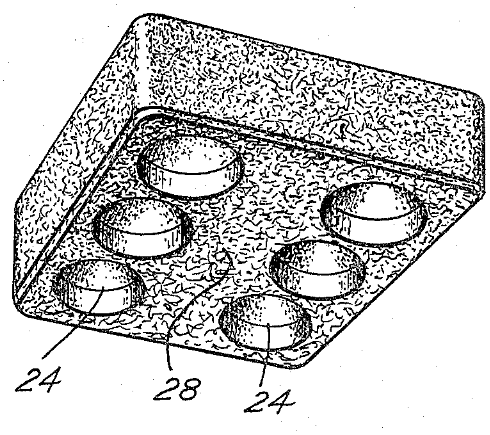
FIG. 4 is a perspective view of a modified form of the block.
Figure 5:
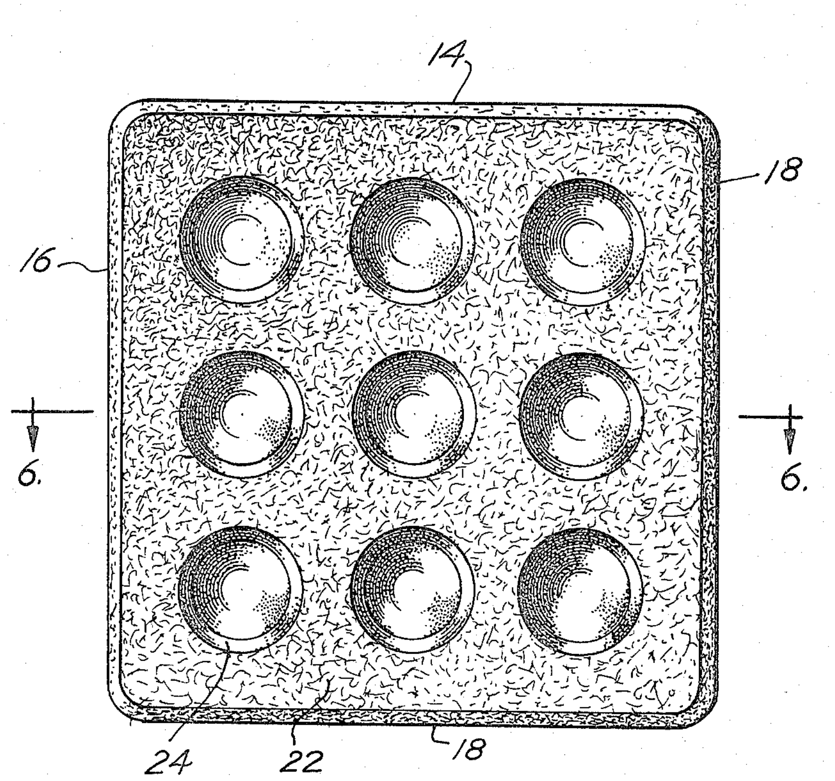
FIG. 5 is a plan view of the bottom of the block shown in FIG. 3.

A modified form of the block is shown in FIG. 4 wherein six holes are disposed in the block, with a relatively large area 28 between the rows. The six-hole block is particularly useful when it is necessary to divide a block to form a desired pattern on the floor. For example, if a staggered pattern is used, a half block is required at some point in a row. The block shown in FIG. 4 can be cut between the two rows of holes, and a bottom surface is provided on each side of each row of holes so that the half-block will be stable when placed on the floor. If, for example, the block shown in FIG. 3 were cut in half, generally along line 6—6 of FIG. 5, the block would have a cut edge similar to that shown in FIG. 6, which divides the center row of holes. The nine hole block cut in this manner tends to be unstable when placed on a flat surface, and the six hole block is preferred for such use.

The composition of a block embodying the present invention includes a mixture of wood particles, a formaldehyde resin and a paraffin base wax which is compressed to form the block and is cured in an oven. Any species of wood fiber may be used, and generally the wood fibers should be granular, with a maximum particle length of approximately four-tenths (4/10) of an inch and maximum particle width and thickness of approximately eight-hundredths (8/100) of an inch. Thus, the wood particles in the block are chips or fibers and can be produced from wood by cutting, grinding, sawing, hammermilling or other similar process. The wood fiber can be obtained from the waste products of other wood manufacturing processes. For example, the chips formed from the manufacture of wood molding or other routing or lathe operating processes can be further processed for use of the fiber for blocks embodying the present invention. As mentioned previously, any species of wood fiber can be used; however, it has been found that woods such as oak which contain tannic acid are less desirable than other wood species. The tannic acid in the oak fibers can be corrosive to equipment used in the present process, and the tannic acid also inhibits the mixing of the formaldehyde resin with the wood fibers, and a completely uniform mixture is desirable. The resin tends to migrate towards the outside of a block formed from the oak wood fibers, and therefore a block containing high concentrations of oak fiber will, at times, tend to have a high concentration of the resin in the outer areas of the block, while the inner area will contain little or no resin and will not be waterproof. For these reasons it is preferred to use woods other than oak and the like which contain tannic acid; however, if the wood fibers are mixed with fibers from other species, even the oak or tannic acid containing fibers can be used.

The processed fibers are screened, and the acceptable size range for screens is in the 6 to 200 mesh range, though the preferred range is from 14 to 20 mesh and the likely range in a manufacturing process is from about ten (10) mesh to about forty (40) mesh size screens. The wood fibers comprise anywhere from about fifty percent (50%) to about ninety-five percent (95%) of the total weight of the block, though preferably the wood fiber concentration will be in the range of about seventy-six percent (76%) to about ninety-one percent (91%) by weight of the block, with a specific preferred concentration of about eighty-eight and five-tenths percent (88.5%) by weight.

The formaldehyde resin used in the mixture of the block can comprise anywhere from about five percent (5%) to about forty percent (40%) of the total weight of the block; however, the more likely range will be about eight percent (8%) to about nineteen percent (19%), and the preferred concentration is about nine and five-tenths percent (9.5%) by weight. The concentration of resin can be varied, and the water resistance of the block is, in part, affected by the concentration of the formaldehyde resin. A soft, highly resilient block can be formed using about five percent (5%) by weight resin concentration; however, a block with this low resin concentration will be only minimally water resistant. A resin concentration of at least about eight percent (8%) by weight is required for achieving significant water resistance, and it has been found that resin concentrations above about nineteen percent (19%) by weight provide only minimal increases in desirable characteristics such as smoothness and surface imperviousness.

Dry or powdered phenol formaldehyde resin has been found to be an appropriate resin for use in the mixture, to provide adequate strength in the block as well as water resistance. The phenol formaldehyde resin is preferred in that the cost thereof does not add substantially to the cost of the block; however, melamine formaldehyde resin is also suitable for use in the mixture. The cost of the melamine formaldehyde resin is generally substantially higher than that for phenol formaldehyde resin, and, therefore, the phenol resin would normally be used. If the blocks are to be colored, it is desirable to use the melamine resin in that pigments used to color the block will mix more readily with, and are more readily accepted by the melamine formaldehyde resin than the phenol formaldehyde resin. The resins can be of either the liquid or powdered type; however, the powdered type is generally preferred for the mixing and curing processes of the method.

The third component of the composition is the aforementioned paraffin base wax, which is a water emulsified wax, a suitable type of which is Mobilcer wax available from the Mobile Company. The wax is not an essential component of the mixture for a block; however, the wax does contribute to the water resistance of the block, while improving the mixing, handling, mold release and other characteristics helpful in carrying out the process. The wax can comprise up to about ten percent (10%) by weight of the total composition; however, more likely the concentration of wax will be within the range of about one percent (1%) to about five percent (5%) by weight, with a preferred concentration of about two percent (2%) by weight.

A summary of the components in the mixture for a block, and the concentrations thereof, together with the size of the wood particles, is found in Chart I, wherein acceptable, preferred and likely ranges for a manufacturing process are given for each of the components.

CHART I

| COMPONENT | RANGE Acceptable | Preferred | Likely |
|---|---|---|---|
| Wood particles | | | |
| (size) | #6-200 mesh | #14-20 mesh | #10-40 mesh |
| (concentration) | 50-95% | 88.5% | 76-91% |
| Formaldehyde resin | | | |
| (concentration) | 5-40% | 9.5% | 8-19% |
| Paraffin base wax | | | |
| (concentration) | 0-10% | 2.0% | 1-5% |

Figure 1:
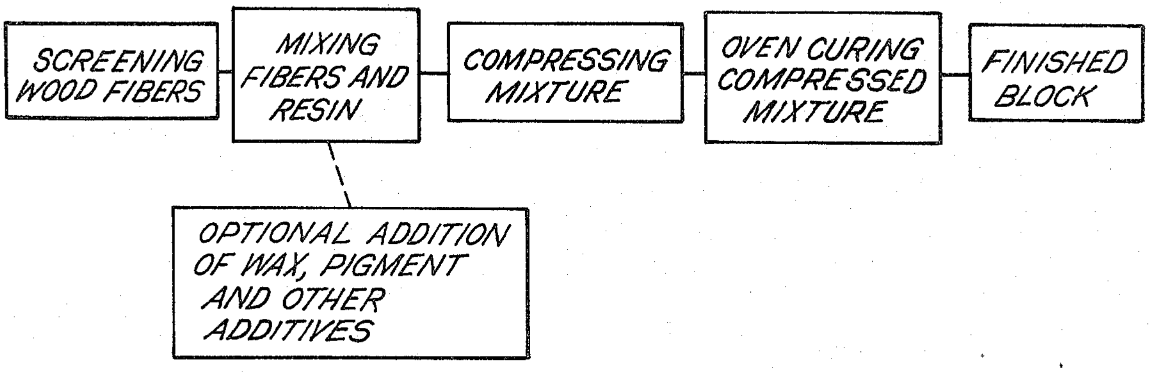
FIG. 1 is a flow diagram of the method for making paving and floor blocks of the present invention.

The method for producing the paving and floor blocks is generally summarized in the flow chart found in FIG. 1. The wood fibers are obtained and screened through the appropriate size screens, with the oversize particles being processed by cutting, grinding, sawing or hammermilling until the appropriate size particles are obtained. The wood fibers, resin and wax are combined in a bin mixer or other suitable mixing device, and the components are thoroughly mixed. The mixing process can take as long as one hour and should continue until a relatively consistent mixture is obtained. If the block is to be colored, the appropriate pigments can be added during the mixing step to become blended with the aforementioned components. Other adhesives for dimensional stability, components for increased fire retardance, antifungal or insect repellent components, or other additives to achieve certain desired characteristics, can also be added during mixing. Normally, the resin used in the process will be a dry resin, although liquid resins may also be used; however, the mixture of components at the end of the mixing step should not contain more than about thirteen percent (13%) moisture based on the oven dry weight of the completed block. Hence, the dry resins are preferred over the fluid resins.

Upon completion of the mixing step, the mixture of components is substantially at room temperature, and a predetermined quantity of the mixture is poured into a mold. The density of the completed block is directly influenced by the quantity of mixture used in the mold. A cover is pressed onto the mold to compress the mixture into the form of the block. The mold and cover form a cavity in the desired shape of the block, and inwardly projecting studs in the mold form the holes in the block. The holes in the block reduce the overall material content of the block, and the tapered and rounded studs which form the holes create desirable flow patterns for the mixture of components as the mold press is closed, which makes compression of the material easier and eliminates air pockets in the mixture. The cross section shown in FIG. 6 indicates the pattern by which the particles flow during the compressing step. One of the characteristics of the mixture is that, when compressed, a body of the mixture becomes most dense in the outer regions nearest the article within which it is compressed. Thus, a smooth, dense surface is formed along the top of the block against the cover of the mold, and the surface will repel moisture and resist wear and abrasion. The flow pattern caused by the studs in the mold results in the creation of areas of greater density between the rounded inner ends of the holes and the upper surface of the block, and along the sides of the holes between the inner ends of the holes and the bottom of the block. Thus, the most dense areas of the block are along the upper surface, between the upper surface and the inner ends of the holes, and down along the sides of the holes to the bottoms of the blocks.

When a five and one-half ($5\frac{1}{2}$) inch square block formed within the likely composition range listed in Chart I is made, four-hundred pounds (400 lbs.) per square inch or a total of about fifty (50) ton closing compression on the mold is used. Less dense and more dense blocks can be made using less or more closing pressure on the mold. It is preferred that the mold be hot when the mixture is poured therein, and a five and one-half ($5\frac{1}{2}$) inch block formed from a mixture within the likely composition range is formed adequately when the mold is heated to three-hundred twenty degrees Fahrenheit (320° F.) before the mixture is poured therein.

The cover is locked in position on the mold after the mixture has been compressed, and the mold and compressed mixture therein are passed into an oven where the composition is cured. A four-hundred fifty degree Fahrenheit (450° F.) oven was used for forming blocks having the nine hole arrangement within the likely composition range listed in Chart I. A curing time of eighteen (18) minutes was found to be adequate for fully curing the block. Another advantage of the holes in the block is that the block cures faster than if no holes are formed, in that all the mixture in the block is near either a top, bottom or side surface of the mold or the inwardly extending studs therein. Thus, in addition to providing a suitable flow pattern for assisting in closing and compressing the mixture in the mold, the studs in the mold which create the holes in the block also minimize the cure time required for the block. The holes should not be so placed in the block as to reduce the strength or stability of the block. Thus, the distance between the inner end of any hole and the top surface of the block should not be less than about one-half ($\frac{1}{2}$) inch, and the distance between holes should not be less than about four-tenths (4/10) of one inch. With the size and spacing for the nine hole arrangement previously stated, all material in the block is within about one-half ($\frac{1}{2}$) inch of a mold surface, thus allowing the material to cure quickly and evenly.

After the block has cured sufficiently, the mold is removed from the oven, the cover holding pins are withdrawn, the cover is removed from the mold and the finished block is ejected therefrom. Blocks formed within the range of likely composition listed in Chart I, are formed under the process conditions stated hereinabove, have surface hardness above the holes of about four thousand pounds (4,000 lbs.) and hardness between the holes at least as great as about two-thousand four-hundred pounds (2,400 lbs.) The blocks are highly resistant to moisture absorption and will not absorb more than about fifteen percent (15%) moisture by weight when submerged for 24 hours in water. Even after 24 hours submersion the blocks will not expand significantly, usually less than about four one-hundredths (0.04) of an inch in thickness and two one-hundredths (0.02) of an inch horizontally. Thus, the blocks are not easily damaged by spills or by submersion in water. The blocks are also highly resistant to abrasion and will provide a long lasting floor covering. Any suitable adhesive can be used for attaching the blocks to a concrete floor or the like; however, hot roofing tar has been found to be an easily applied, suitable adhesive. The resins used in the mixture are self-extinguishing, and the compressed wood fibers will not ignite easily. Thus, the block is also highly fire resistant.

Floor blocks embodying the present invention may be used for aesthetic purposes in addition to the use for long wearing water resistant floors. For example, polyurethane coatings can be applied to the blocks and the blocks can be used for walls, wall dividers and the like. In addition to industrial uses, many residential applications exist for the block, such as patio floors, swimming pool decks and decorative accents.

Although one embodiment and several modifications of a paving and floor block have been shown and described in detail herein, various changes may be made without departing from the scope of the present invention.

We claim:

1. A paving and floor block comprising a body having an upper wear surface and being composed of a compressed and cured mixture of wood particles of a size range between about 6 and 200 mesh, formaldehyde resin, and paraffin base wax mixed with said wood particles, said resin comprising between about five percent (5%) and about forty percent (40%) by weight of said mixture, and said wax comprising up to about ten percent (10%) by weight of said mixture for said block, said body having a plurality of spaced holes extending upwardly therein, and relatively dense areas of said mixture disposed around said holes and extending upwardly therefrom to form a plurality of relatively hard regions in said wear surface.

2. A paving and floor block as defined in claim 1 in which said formaldehyde resin is phenol formaldehyde.

3. A paving and floor block as defined in claim 1 in which pigment is added to said mixture for coloring said block.

4. A paving and floor block as defined in claim 1 in which said formaldehyde resin is melamine formaldehyde.

5. A paving and floor block as defined in claim 4 in which pigment is added to said mixture for coloring said block.

6. A paving and floor block as defined in claim 1 in which said wood particles are within a size range between about ten (10) and about forty (40) mesh.

7. A paving and floor block as defined in claim 6 in which said resin comprises between about eight percent (8%) and about nineteen percent (19%) of the total weight of the composition.

8. A paving and floor block as defined in claim 7 in which said wax comprises between about one percent (1%) and about five percent (5%) of the total weight of the composition.

9. A paving and floor block as defined in claim 1 in which said resin comprises between about eight percent (8%) and about nineteen percent (19%) of the total weight of the composition.

10. A paving and floor block as defined in claim 1 in which said wax comprises between about one percent (1%) and about five percent (5%) of the total weight of the composition.

11. A paving and floor block comprising a body having an upper wear surface and being composed of a compressed and cured mixture containing by weight about eighty-eight and five-tenths percent (88.5%) wood fibers of a size between about fourteen (14) and about twenty (20) mesh, about nine and five-tenths percent (9.5%) formaldehyde resin, and about two percent (2%) paraffin base wax, said body having a plurality of spaced holes extending upwardly therein, and relatively dense areas of said mixture disposed around said holes and extending upwardly therefrom to form a plurality of relatively hard regions in said wear surface.

12. A paving and floor block as defined in claim 11 in which said resin is a phenol formaldehyde resin.

13. A paving and floor block as defined in claim 11 in which said resin is a melamine formaldehyde resin.

* * * * *